(12) United States Patent
Wei et al.

(10) Patent No.: US 10,491,607 B2
(45) Date of Patent: Nov. 26, 2019

(54) METHOD AND SYSTEM FOR IMPLEMENTING VERIFICATION WITHIN DATA TRANSFER

(71) Applicant: TENCENT TECHNOLOGY (SHENZHEN) COMPANY LIMITED, Shenzhen, Guangdong (CN)

(72) Inventors: Dezhi Wei, Shenzhen (CN); Yixin Guo, Shenzhen (CN); Wenqin Wu, Shenzhen (CN); Weitao Zheng, Shenzhen (CN); Zhaochuang Wang, Shenzhen (CN); Zhang Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 128 days.

(21) Appl. No.: 15/719,172

(22) Filed: Sep. 28, 2017

(65) Prior Publication Data

US 2018/0020009 A1  Jan. 18, 2018

Related U.S. Application Data

(63) Continuation of application No. PCT/CN2016/084265, filed on Jun. 1, 2016.

(30) Foreign Application Priority Data

Sep. 9, 2015  (CN) .......................... 2015 1 0571636

(51) Int. Cl.
  *H04L 29/06* (2006.01)
  *H04W 12/06* (2009.01)
  (Continued)

(52) U.S. Cl.
  CPC ......... *H04L 63/123* (2013.01); *G06Q 20/227* (2013.01); *G06Q 20/3223* (2013.01);
  (Continued)

(58) Field of Classification Search
  None
  See application file for complete search history.

(56) References Cited

U.S. PATENT DOCUMENTS 8,577,804 B1 * 11/2013 Bacastow ............ G06Q 20/027
  235/380
2005/0114367 A1 * 5/2005 Serebrennikov ....... G06Q 20/16
  (Continued)

FOREIGN PATENT DOCUMENTS

CN  101329801 A  12/2008
CN  103186851 A  7/2013
  (Continued)

OTHER PUBLICATIONS

Kyrillidis, Lazaros et al. Card-present Transactions on the Internet Using the Smart Card Web Server. 2013 12th IEEE International Conference on Trust, Security and Privacy in Computing and Communications. https://ieeexplore.ieee.org/stamp/stamp.jsp?tp=&arnumber=6680893 (Year: 2013).*
(Continued)

*Primary Examiner* — Jeremiah L Avery
(74) *Attorney, Agent, or Firm* — Knobbe, Martens, Olson & Bear, LLP (57) ABSTRACT

A method and system for implementing verification within data transfer are provided. The method includes obtaining a user card identifier and a data transfer password of a selected user card through a data transfer request interface. A data transfer verification request to a data transfer server is initiated, the data transfer verification request being generated according to the user card identifier, the data transfer password and a data transfer user identifier. A current time valid identifier that is returned by the data transfer server is received when the data transfer verification is passed, the current time valid identifier being issued when the data transfer server determines that the current time does not
(Continued)

exceed a valid period of card-binding time of the selected user card. A secondary verification interface is skipped according to the current time valid identifier. A data transfer confirmation interface is entered.

13 Claims, 8 Drawing Sheets (51) Int. Cl.
| | |
|---|---|
| G06Q 20/22 | (2012.01) |
| G06Q 20/32 | (2012.01) |
| G06Q 20/40 | (2012.01) |
| G06Q 20/42 | (2012.01) |
| H04W 12/00 | (2009.01) |

(52) U.S. Cl.
CPC ....... *G06Q 20/4012* (2013.01); *G06Q 20/425* (2013.01); *H04L 63/08* (2013.01); *H04L 63/083* (2013.01); *H04L 63/0876* (2013.01); *H04W 12/06* (2013.01); *H04L 2463/082* (2013.01); *H04W 12/00502* (2019.01); *H04W 12/00512* (2019.01); *H04W 12/00514* (2019.01)

(56) References Cited

U.S. PATENT DOCUMENTS

| | | | | |
|---|---|---|---|---|
| 2006/0235795 | A1* | 10/2006 | Johnson | G06Q 20/02 705/44 |
| 2008/0275748 | A1* | 11/2008 | John | G06Q 30/06 705/35 |
| 2009/0138367 | A1* | 5/2009 | Okawa | G06Q 20/02 705/26.1 |
| 2009/0198618 | A1* | 8/2009 | Chan | G06Q 20/02 705/66 |
| 2009/0327133 | A1* | 12/2009 | Aharoni | G06Q 20/10 705/44 |
| 2010/0327054 | A1* | 12/2010 | Hammad | G06F 21/34 235/375 |
| 2011/0137797 | A1* | 6/2011 | Stals | G06O 20/02 705/44 |
| 2011/0202466 | A1* | 8/2011 | Carter | G06Q 20/20 705/67 |
| 2013/0159186 | A1* | 6/2013 | Brudnicki | G06Q 20/227 705/44 |
| 2015/0302374 | A1* | 10/2015 | Sartor | G06Q 20/02 705/16 |
| 2017/0017958 | A1* | 1/2017 | Scott | G06Q 20/40 |
| 2017/0221055 | A1* | 8/2017 | Carlsson | G06Q 20/3821 |
| 2017/0302641 | A1* | 10/2017 | Ramatchandirane | H04L 63/0421 |

FOREIGN PATENT DOCUMENTS

| | | |
|---|---|---|
| JP | 2002-222315 A | 8/2002 |
| JP | 2002-298042 A | 10/2002 |
| JP | 2004-070894 A | 3/2004 |
| JP | 2005-182212 A | 7/2005 |
| JP | 2010-191680 A | 9/2010 |
| JP | 2011-100439 A | 5/2011 |
| JP | 2013-186549 A | 9/2013 |
| WO | WO 2015/067038 A1 | 5/2015 |

OTHER PUBLICATIONS

Chang, Ya-Fen; Chang, Pei-Yu. Comments on a Dynamic-ID-based Remote User Authentication Scheme for Multi-server Environment Using Smart Cards. 2912 Sixth International Conference on Genetic and Evolutionary Computing. https://ieeexlore.ieee.org/stamp/stamp.jsp?tp=&arnumber=6457252 (Year: 2012)*

Office Action with Translation Issued for Japanese Application No. 2017-560526 dated Sep. 14, 2018.

Office Action with Translation Issued for Korean Application No. 10-2017-7034954 dated Aug. 22, 2018.

International Preliminary Report on Patentability for International Application No. PCT/CN2016/084265 dated Mar. 13, 2018.

International Search Report with Translation for International Application No. PCT/CN2016/084265 dated Aug. 31, 2016, 4 pages.

* cited by examiner

METHOD AND SYSTEM FOR IMPLEMENTING VERIFICATION WITHIN DATA TRANSFER

This application is a continuation of International Application No. PCT/CN2016/084265, filed on Jun. 1, 2016. This application claims the benefit and priority of Chinese Patent Application No. 201510571636.6, filed on Sep. 9, 2015. The entire disclosures of each of the above applications are incorporated herein by reference in their entirety for all purposes.

FIELD OF THE TECHNOLOGY

The present disclosure relates to computer application technologies, and more particularly to a method and system for implementing verification within data transfer.

BACKGROUND OF THE DISCLOSURE

With the development of Internet technologies, online load performed through terminals such as smartphones or computers have become popular increasingly, thereby improving the convenience of load. Since sensitive information of users is necessarily involved in the load on Internet, security verification is needed during a load operation.

In a method for implementing verification, a payment password is verified first during a load process, and then a Short Message Service (SMS) verification code is verified. The two verification operations enhance the security of the load on Internet, but increase the processing complexity of terminal, thereby affecting the operating efficiency of other applications running on the terminal.

SUMMARY

Embodiments of the present disclosure provide a method for implementing verification within data transfer.

Embodiments of the present disclosure provide a system for implementing verification within data transfer.

The method for implementing verification within data transfer includes:
obtaining a user card identifier and a data transfer password of a selected user card through a data transfer request interface;
initiating a data transfer verification request to a data transfer server, the data transfer verification request being generated according to the user card identifier, the data transfer password and a data transfer user identifier;
receiving a current time valid identifier that is returned by the data transfer server when the data transfer verification is passed, the current time valid identifier being issued when the data transfer server determines that the current time does not exceed a valid period of card-binding time of the selected user card; and
skipping a second verification interface according to the current time valid identifier and directly entering a data transfer confirmation interface.

The system for implementing verification within data transfer includes a processor and a non-transitory storage medium, wherein the non-transitory storage medium stores one or more computer readable instructions, and the processor executes the computer readable instructions stored in the non-transitory storage to
obtain a user card identifier and a data transfer password of a selected user card from a data transfer request interface;
initiate a data transfer verification request to a data transfer server, the data transfer verification request being generated according to the user card identifier, the data transfer password and a data transfer user identifier;
receive a current time valid identifier that is returned by the data transfer server when the data transfer verification is passed, the current time valid identifier being issued when the data transfer server determines that the current time does not exceed a valid period of card-binding time of the selected user card; and
skip a second verification interface according to the current time valid identifier and directly enter a data transfer confirmation interface.

A non-transitory computer readable storage medium for storing programs, wherein the programs are executed by a computer to perform a process of:
obtaining a user card identifier and a data transfer password of a selected user card through a data transfer request interface;
initiating a data transfer verification request to a data transfer server, the data transfer verification request being generated according to the user card identifier, the data transfer password and a data transfer user identifier;
receiving a current time valid identifier that is returned by the data transfer server when the data transfer verification is passed, the current time valid identifier being issued when the data transfer server determines that the current time does not exceed a valid period of card-binding time of the selected user card; and
skipping a second verification interface according to the current time valid identifier and directly entering a data transfer confirmation interface.

DESCRIPTION OF EMBODIMENTS

Various embodiments having features and merits of the present disclosure will be illustrated in detail in the following description. It should be noted that various improvements made on the embodiments are within the protection scope of the present disclosure, and the descriptions and figures are only used for description rather than used to limit the present disclosure.

Figure 1:
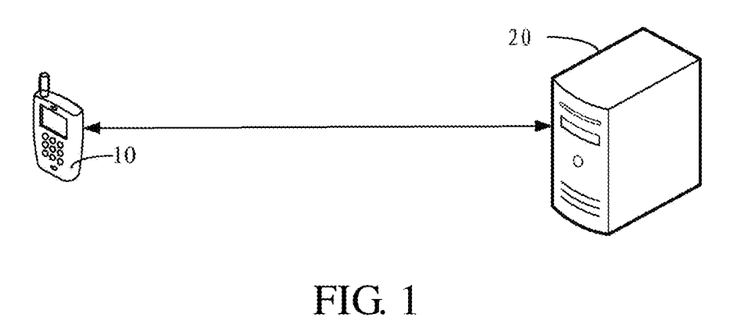
FIG. 1 is a diagram illustrating the structure of a computer system for operating a method for implementing verification within data transfer according to an embodiment of the present disclosure.

According to an embodiment, a method for implementing verification within data transfer is provided. A computer system for operating the method is shown in FIG. 1. The computer system includes a terminal 10 and a server 20.

The terminal 10 may be a smartphone, a tablet, or a computer. The terminal 10 may implement security verification within data transfer through interacting with the server 20, so that the server 20 may complete the data transfer.

Figure 2:
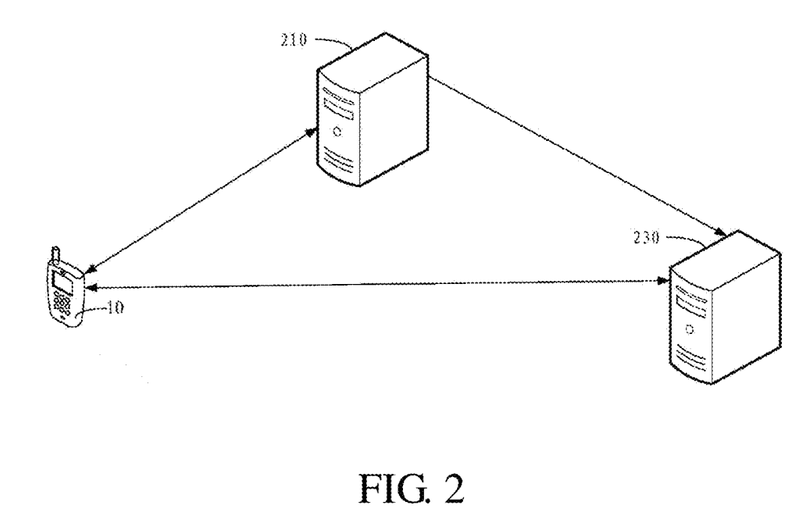
FIG. 2 is a diagram illustrating the structure of a computer system for operating a method for implementing verification within data transfer according to another embodiment of the present disclosure.

In an implementation, as shown in FIG. 2, the server 20 includes a data transfer server 210 and a payment server 230. The payment server 230 may store user card data when the terminal 10 invokes a card-binding public component.

Moreover, the method for implementing verification within data transfer is implemented through the data transfer server 210 and the payment server 230, which helps to use a conventional structure, for example, the structure of a computer system including the data transfer server 210 and the payment server 230.

Figure 3:
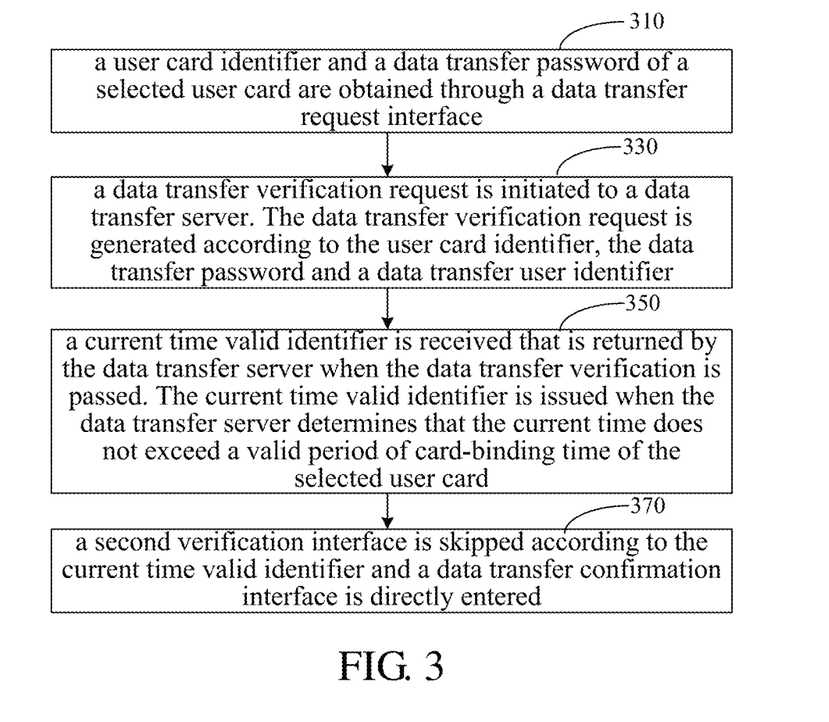
FIG. 3 is a flowchart illustrating a method for implementing verification within data transfer according to an embodiment of the present disclosure.

Referring to FIG. 3, a method for implementing verification within data transfer is provided according to an embodiment, which includes following blocks.

At block 310, a user card identifier and a data transfer password of a selected user card are obtained through a data transfer request interface. In some embodiments of the present disclosure, the data transfer password is also called a payment password.

The data transfer request interface is used to implement a data transfer request of a user in a terminal. The data transfer request interface may belong to an online payment application or a social network application running on the terminal, for example, an additional payment interface in the social network application or a transfer interface in the online payment application.

The user may log on the online payment application or the social network application through his user identifier and enter the data transfer request interface to complete such operations as payment, transfer and load. The online payment application or the social network application may be provided in the form of a software client or a webpage client, and the data transfer request interface may be provided in the form of a window of the software client or a webpage of the webpage client.

In the data transfer request interface, user cards added by the user may be displayed in the form of a user card identifier list. A user card selection entrance is added in the data transfer request interface. Through triggering a selection operation in the user card selection entrance, the selected user card may be obtained from the added user cards, and further the user card identifier of the selected user card may be obtained. For example, when the selected user card is a bank card, the obtained user card identifier is the number of the bank card.

In this embodiment, each user card identifier in the user card identifier list displays part of information of the user card. For example, when the user card identifier is the number of a bank card, the user card identifier list displays the last four digits of the number of the bank card, so as to ensure the security of sensitive information of the user.

The payment password may be obtained through triggering an input operation in the terminal by the user when the user selects the user card. The input operation may be directly performed in the data transfer request interface, or may be performed in an input dialog box popped from the data transfer request interface.

At block 330, a data transfer verification request is initiated to a data transfer server. The data transfer verification request is generated according to the user card identifier, the data transfer password and a data transfer user identifier. In some embodiments of the present disclosure, the data transfer verification request is a payment verification request.

The data transfer user identifier may uniquely identify the identity of the user triggering the data transfer request operation. As mentioned above, the data transfer request interface may belong to the online payment application or the social network application, and a user identifier used by the user when logging on the online payment application or the social network application may uniquely identify the identity of the user. Accordingly, the data transfer user identifier may be the user identifier for logging on the online payment application or the social network application.

The user card identifier and the payment password may uniquely identify the user card and ensure the validity of the user card. Accordingly, the payment verification request generated according to the user card identifier, the payment password and the data transfer user identifier may be used to verify the security of the identity of the user and the security of the selected user card, so as to ensure the security of data transfer.

In an embodiment, the payment password may be transferred to the data transfer server in the form of encryption. The data transfer server does not decrypt the encrypted payment password, so as to further ensure the security of the sensitive information of the user.

At block 350, a current time valid identifier is received that is returned by the data transfer server when the data transfer verification is passed. The current time valid identifier is issued when the data transfer server determines that the current time does not exceed a valid period of card-binding time of the selected user card.

The current time is the time at which the user triggers the data transfer request operation, and the card-binding time is the time at which the selected user card is bound with the data transfer user identifier.

The data transfer server determines the validity of the current time according to the card-binding time after the payment verification is passed. If the data transfer server determines that the current time is valid, it is indicated that the data transfer request operation is triggered by the user within a secure valid period, and the data transfer server issues the current time valid identifier to the terminal.

At block 370, a second verification interface is skipped according to the current time valid identifier and a data transfer confirmation interface is directly entered.

Since the current time valid identifier is issued when the data transfer request operation is triggered by the user within the secure valid period, the terminal can learn, after receiving the current time valid identifier, that the second verification process is not needed. Accordingly, the terminal can directly enter the data transfer confirmation interface to complete data transfer confirmation operations.

In the above method, the data transfer server determines the validity of the current time according to the card-binding time, so that the terminal can avoid one security verification process based on the current time valid identifier. In this case, the fastness of the data transfer verification can be implemented, the processing complexity of the terminal can be decreased within data transfer, and the operating efficiency of other applications running on the terminal is not affected.

Moreover, the user can skip the second verification process according to the current time valid identifier and directly perform the data transfer confirmation operations in the data transfer confirmation interface, thereby simplifying the operations of the user within data transfer and improving the efficiency of the data transfer operations.

Figure 4:
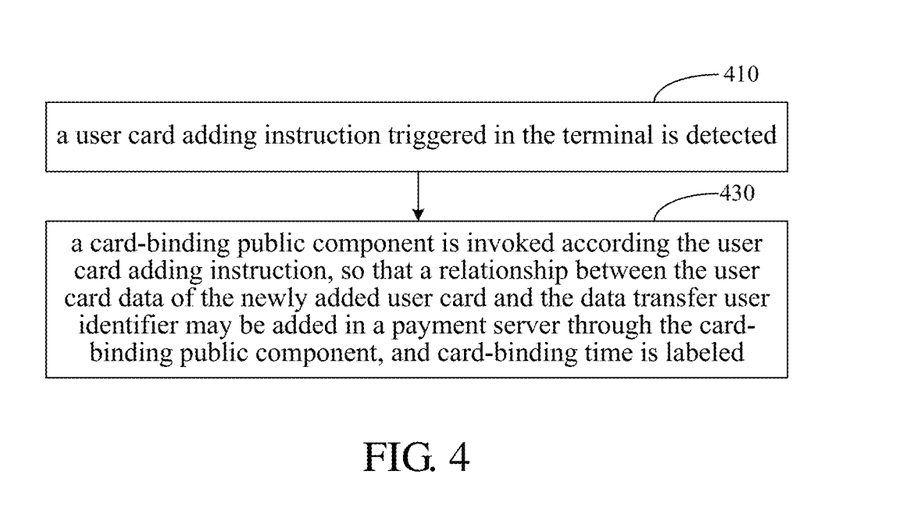
FIG. 4 is a flowchart illustrating a method for implementing verification within data transfer according to another embodiment of the present disclosure.

Referring to FIG. 4, in an embodiment, the above method further includes following blocks.

At block 410, a user card adding instruction triggered in the terminal is detected.

As mentioned above, what are displayed in the data transfer request interface are user cards added by the user, but the user card selected by the user is not displayed in the data transfer request interface. Accordingly, a triggering operation may be performed in the terminal to add the selected user card.

A user card adding entrance may be set in the data transfer request interface. Through triggering a clicking operation in the user card adding entrance by the user, the terminal can detect the user card adding instruction to add the user card.

At block 430, a card-binding public component is invoked according the user card adding instruction, so that a relationship between the user card data of the newly added user card and the data transfer user identifier may be added in a payment server through the card-binding public component, and card-binding time is labeled.

After detecting the user card adding instruction, the terminal invokes the card-binding public component to add the user card. The card-binding public component may be a third-party plug-in in the terminal, for example, a card-binding module provided in the social network application.

The card-binding public component invoked by the terminal may be used to perform a card-binding operation for the newly added user card and the data transfer user identifier in the payment server, which is implemented as follows.

The user card data of the newly added user card is obtained according to the user card adding instruction. In an embodiment, the user card data may include a user card identifier, a user card type and so on. For example, when the user card is a bank card, the user card identifier is the number of the bank card, and the user card type is the type of the bank card.

The user card data and the data transfer user identifier are reported to the payment server, so that the payment server issues verification information. The verification information may be sent to the terminal in the form of short messages or mails. The verification information at least includes a verification code used for security verification. The verification code is randomly generated according to a predefined mode by the payment server.

The verification code is submitted according to the issued verification information, and the submitted verification code corresponds to a verification code extracted from the verification information.

A card-binding confirmation request is initiated to the payment server through the submitted verification code, and the verification code is verified in the payment server, so as to ensure the validity of the user identity of the newly added user card.

After the verification of the verification code is passed, a card-binding operation is performed in the payment server, that is, the relationship between the user card data of the newly added user card and the data transfer user identifier is added in the payment server, and the time at which the relationship is added is labeled as the card-binding time.

After the card-binding operation, the newly added user card is displayed in the data transfer request interface, so as to be selected by the user.

In an embodiment, the user card identifier included in the user card data is complete, but the user card identifier displayed in the data transfer request interface is only a part of the complete user card identifier. For example, the user card identifier included in the user card data has 19 digits, but the user card identifier displayed in the data transfer request interface is the last four digits of the 19 digits.

Figure 5:
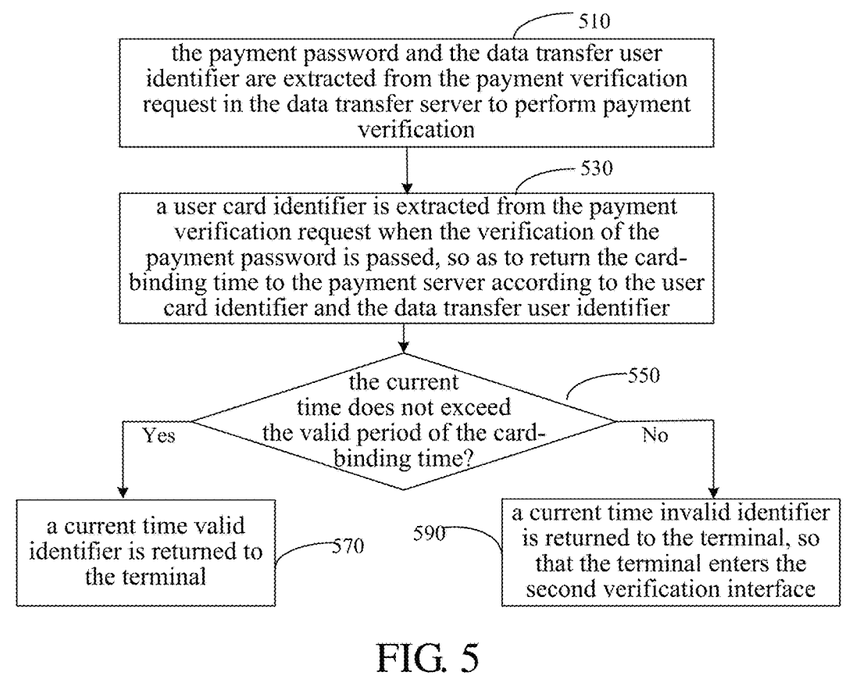
FIG. 5 is a flowchart illustrating a method for implementing verification within data transfer according to another embodiment of the present disclosure.

Referring to FIG. 5, in an embodiment, the above method further includes following blocks.

At block 510, the payment password and the data transfer user identifier are extracted from the payment verification request in the data transfer server to perform payment verification.

After extracting the payment password and the data transfer user identifier from the payment verification request, the data transfer server performs security verification for the payment password to determine whether the payment password input by the user corresponding to the data transfer user identifier is correct. If the data transfer server determines that the payment password input by the user corresponding to the data transfer user identifier is correct, the user is allowed to perform subsequent operations of data transfer.

At block 530, a user card identifier is extracted from the payment verification request when the verification of the payment password is passed, so as to return the card-binding time to the payment server according to the user card identifier and the data transfer user identifier.

In an implementation, a card-binding information obtaining request is initiated to the payment server according to the extracted user card identifier and the data transfer user identifier.

Since the card-binding time and the relationship between the user card data of the user card and the data transfer user identifier are both stored in the payment server during the card-binding operation process, the payment server can obtain the user card data and the card-binding time when receiving the card-binding information obtaining request.

When there are multiple pieces of card-binding time and multiple pieces of user card data having relationship with the data transfer user identifier, in the data transfer server, a consistency matching operation is performed between the last one or more digits of the extracted user card identifier and the last one or more digits of the user card identifier in the user card data, so as to obtain the user card data and the card-binding time that are needed when the user performs the data transfer operation. In this case, the data transfer server may perform the subsequent operations of data transfer according to the obtained user card data and the card-binding time.

At block 550, it is determined whether the current time does not exceed the valid period of the card-binding time. If the current time does not exceed the valid period of the card-binding time, block 570 is performed; if the current time exceeds the valid period of the card-binding time, block 590 is performed.

As mentioned above, the user cards displayed in the data transfer request interface are all added through invoking the card-binding public component by the terminal. Since one security verification process must be performed during the card-binding operation process, the validity and security of the added user card and the user identity corresponding to the added user card can be ensured within a secure valid period, i.e., within the valid period of the card-binding time, for example, 10 minutes after the card-binding time.

Further, the validity of the current time is determined according to the card-binding time. If it is determined that the current time does not exceed the valid period of the card-binding time, i.e., the time difference between the current time and the card-binding time is within a valid time range, block 570 is performed, which indicates that the validity and security of the selected user card and the user identity corresponding to the selected user card are still valid. In this case, the terminal may skip the second verification interface and directly enters the data transfer confirmation interface.

If it is determined that the current time exceeds the valid period of the card-binding time, i.e., the time difference between the current time and the card-binding time exceeds the valid time range, block 590 is performed, which indicates that the validity and security of the selected user card and the user identity corresponding to the selected user card have been invalid. In this case, the terminal needs to enter the second verification interface to perform the second verification process for the validity and security of the selected user card and the user identity corresponding to the selected user card.

At block 570, a current time valid identifier is returned to the terminal.

According to the above method, within a secure valid period, by using a security verification result of the verification code obtained during the card-binding process, the terminal may perform only one verification process, i.e., the verification of the payment password, without needing to perform the second verification process. Accordingly, the process of data transfer in the terminal can be simplified, the processing complexity of the terminal can be decreased within data transfer, and the fastness of data transfer and the efficiency of user operations can be improved.

At block 590, a current time invalid identifier is returned to the terminal, so that the terminal enters the second verification interface.

Figure 6:
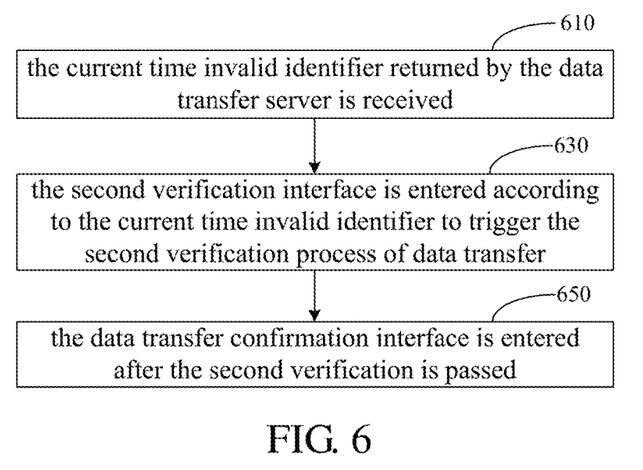
FIG. 6 is a flowchart illustrating a method for implementing verification within data transfer according to another embodiment of the present disclosure.

Referring to FIG. 6, in an embodiment, the above method further includes following blocks.

At block 610, the current time invalid identifier returned by the data transfer server is received.

As mentioned above, the current time invalid identifier is issued when the data transfer server determines that the current time exceeds the valid period of the card-binding time. In this case, the terminal needs to enter the second verification interface to perform second verification for the validity and security of the elected user card and the user identity corresponding to the selected user card.

Accordingly, the data transfer server issues a second verification code to the terminal when returning the current time invalid identifier to the terminal. The second verification code may be issued to the terminal in the form of short messages or emails. The second verification code may be generated according to a predefined mode by the data transfer server.

At block 630, the second verification interface is entered according to the current time invalid identifier to trigger the second verification process of data transfer.

After the terminal enters the second verification interface according to the current time invalid identifier, the second verification of data transfer may be implemented by the terminal as follows.

The second verification code issued by the data transfer server is submitted in the second verification interface to request the data transfer server to perform security verification for the submitted second verification code.

After receiving the request, the data transfer server performs security verification to determine the validity and security of the selected user card and the user identity corresponding to the selected user card. If it is determined that the selected user card and the user identity corresponding to the selected user card are valid and secure, i.e., the second verification is passed, a second verification result is returned to the terminal, so that the terminal can enter the data transfer confirmation interface according to the second verification result.

At block 650, the data transfer confirmation interface is entered after the second verification is passed.

According to the above method, if the current time at which the user performs the data transfer request operation exceeds the valid period of the card-binding time, the terminal performs the verification of the payment password and the verification of the second verification code. Accordingly, during the data transfer process, the valid period of the card-binding time is used as a determining standard, the verification of the payment password is performed firstly, and then the verification of the second verification code is performed, thereby ensuring the security of data transfer, decreasing the processing complexity of the terminal within data transfer, and not affecting the operating efficiency of other applications running on the terminal.

Figure 7:
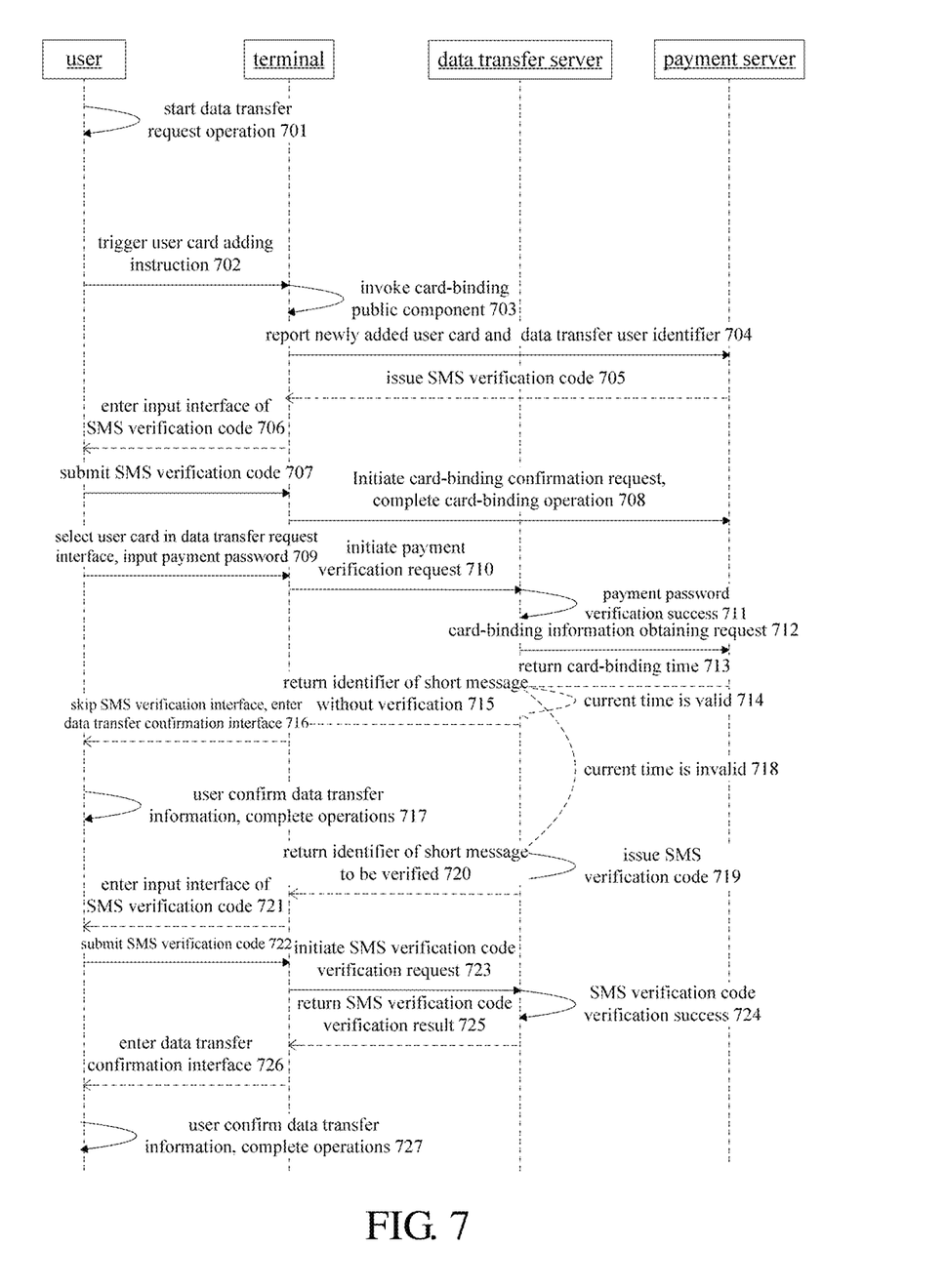
FIG. 7 is a diagram illustrating the execution sequence of a method for implementing verification within data transfer according to an embodiment of the present disclosure.

In a scenario shown in FIG. 7, an execution process of a method for implementing verification within data transfer is shown according to an embodiment. For example, the terminal is a smartphone, the social network application runs on the smartphone, and the user performs data transfer operations through the social network application. The embodiment will be illustrated as follows.

After logging on the social network application, the user enters the data transfer request interface to perform block 701. If a user card for which data transfer is to be performed has been added to the user card identifier list, block 709 is performed; otherwise, blocks 702-708 is performed firstly, and then block 709 is performed.

Through performing blocks 702-708, the card-binding operation between the newly added user card and the data transfer user identifier can be implemented. During the card-binding operation, one SMS verification process will be initiated through the terminal, so as to ensure the validity of the newly added user card. After the card-binding operation, the newly added user card is added to the user card identifier list, so as to be selected by the user.

After block 709, the terminal initiates a payment verification request to the data transfer server at block 710. Further, the first verification process within data transfer, i.e., the verification of the payment password, is completed at block 711. After the first verification process is passed, blocks 712-713 are performed, so as to obtain the card-binding time returned by the payment server.

The data transfer server determines, according to the returned card-binding time, the validity of the current time at which the user initiates the data transfer request operation, so as to further determine whether the second verification process, i.e., the verification of SMS verification code, is needed within data transfer.

If block 718 is performed, it is indicated that the current time exceed the valid period of the card-binding time, and blocks 719-727 are performed, so that the terminal continues to perform the verification of the SMS verification code after the verification of the payment password.

If block 714 is performed, it is indicated that the current time does not exceed the valid period of the card-binding time, and blocks 715-717 are performed. Accordingly, within the data transfer, the terminal can fully utilize the SMS verification mechanism during the card-binding operation process, avoid the verification of the SMS verification code within the secure valid period, simplify the verification process, decrease the processing complexity of the terminal, and improve the efficiency of data transfer operations.

Figure 8:
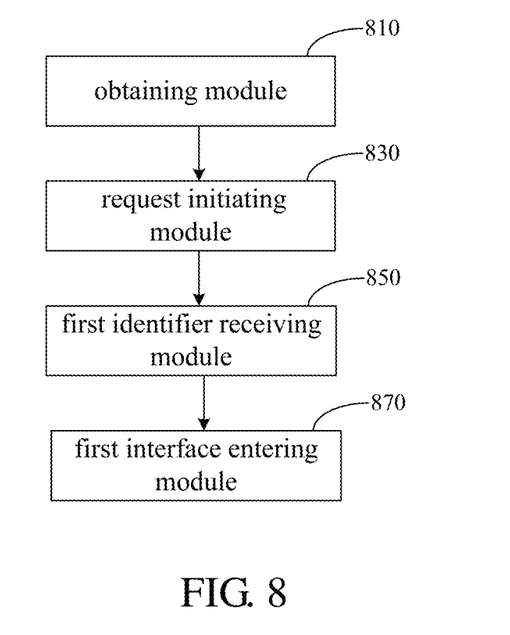
FIG. 8 is a diagram illustrating the structure of a system for implementing verification within data transfer according to an embodiment of the present disclosure.

Referring to FIG. 8, a system for implementing verification within data transfer is provided according to an embodiment. The system includes an obtaining module 810, a request initiating module 830, a first identifier receiving module 850 and a first interface entering module 870.

The obtaining module 810 may obtain a user card identifier and a payment password of a selected user card through a data transfer request interface.

The request initiating module 830 may initiate a payment verification request to a data transfer server. The payment verification request is generated according to the user card identifier, the payment password and a data transfer user identifier.

The first identifier receiving module 850 may receive a current time valid identifier that is returned by the data transfer server when the payment verification is passed. The current time valid identifier is issued when the data transfer server determines that the current time does not exceed a valid period of card-binding time of the selected user card.

The first interface entering module 870 may skip a second verification interface according to the current time valid identifier and directly enter a data transfer confirmation interface.

Figure 9:
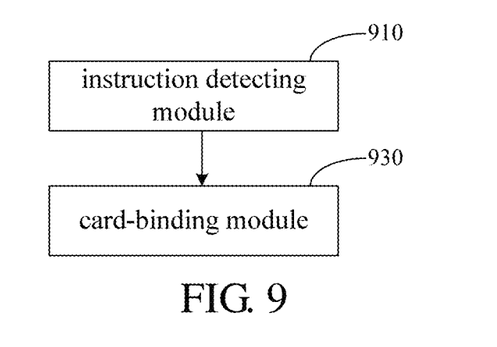
FIG. 9 is a diagram illustrating the structure of a system for implementing verification within data transfer according to another embodiment of the present disclosure.

Referring to FIG. 9, in an embodiment, the above system further includes an instruction detecting module 910 and a card-binding module 930.

The instruction detecting module 910 may detect a user card adding instruction triggered in the terminal.

The card-binding module 930 may invoke the card-binding public component according to the user card adding instruction, so that a relationship between the user card data of the newly added user card and the data transfer user identifier may be added in a payment server through the card-binding public component, and card-binding time is labeled.

Figure 10:
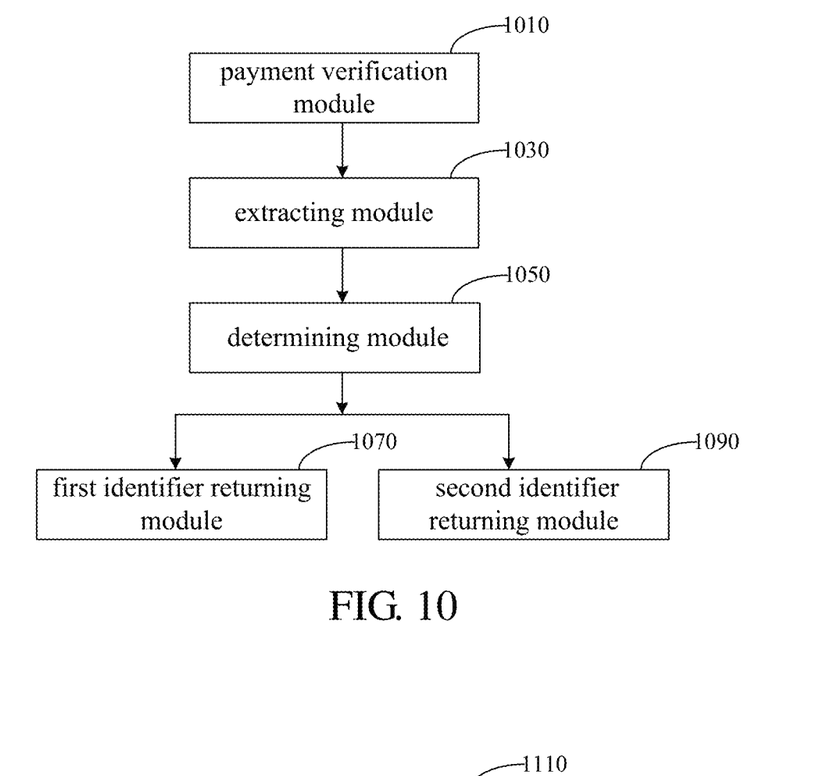
FIG. 10 is a diagram illustrating the structure of a system for implementing verification within data transfer according to another embodiment of the present disclosure.

Referring to FIG. 10, in an embodiment, the above system further includes a payment verification module 1010, an extracting module 1030, a determining module 1050, a first identifier returning module 1070 and a second identifier returning module 1090.

The payment verification module 1010 may extract the payment password and the data transfer user identifier from the payment verification request in the data transfer server to perform payment verification.

The extracting module 1030 may extract a user card identifier from the payment verification request when the verification of the payment password is passed, so as to return the card-binding time to the payment server according to the user card identifier and the data transfer user identifier.

The determining module 1050 may determine whether the current time does not exceed the valid period of the card-binding time; when determining that the current time does not exceed the valid period of the card-binding time, indicate the first identifier returning module 1070; when determining that the current time exceeds the valid period of the card-binding time, indicate the second identifier returning module 1090.

The first identifier returning module 1070 may return a current time valid identifier to the terminal.

The second identifier returning module 1090 may return a current time invalid identifier to the terminal, so that the terminal enters the second verification interface.

Figure 11:
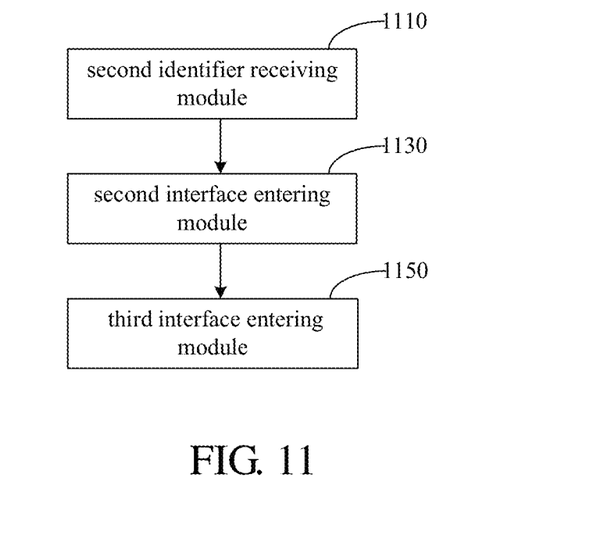
FIG. 11 is a diagram illustrating the structure of a system for implementing verification within data transfer according to another embodiment of the present disclosure.

Referring to FIG. 11, in an embodiment, the above system further includes a second identifier receiving module 1110, a second interface entering module 1130 and a third interface entering module 1150.

The second identifier receiving module 1110 may receive the current time invalid identifier returned by the data transfer server.

The second interface entering module 1130 may enter the second verification interface according to the current time invalid identifier to trigger the second verification process of data transfer.

The third interface entering module 1150 may enter he data transfer confirmation interface after the second verification is passed.

Figure 12:
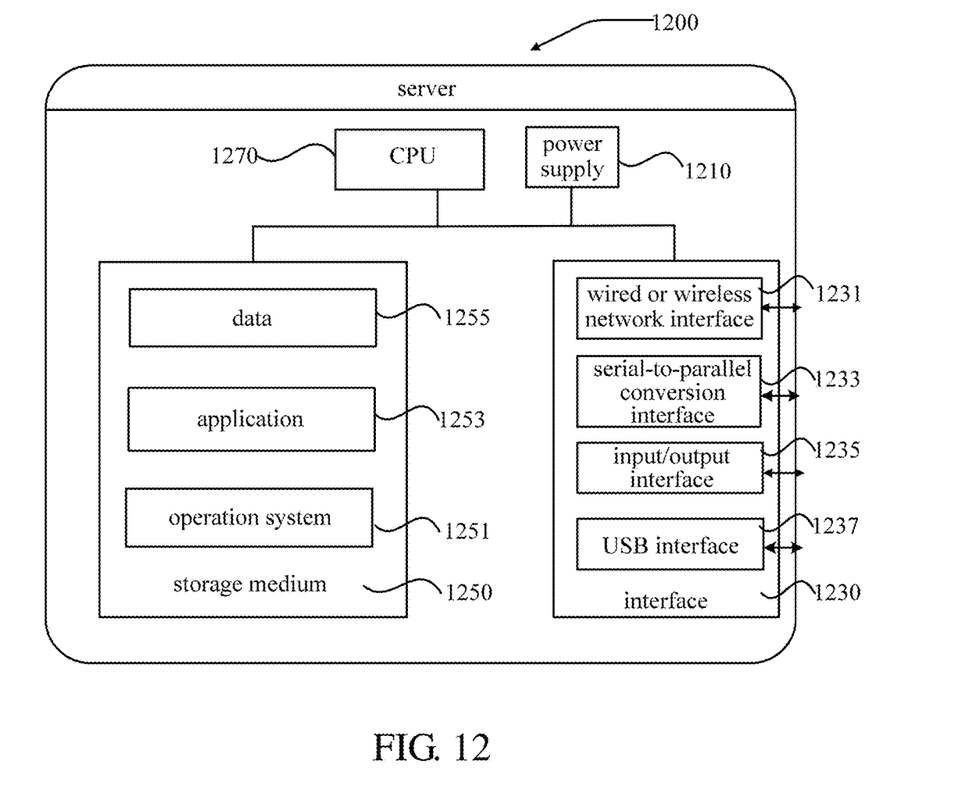
FIG. 12 is a diagram illustrating the structure of a server according to an embodiment of the present disclosure.

FIG. 12 is a diagram illustrating the structure of a server 1200 according to an embodiment of the present disclosure. The blocks performed by the data transfer server in the above embodiments may be based on the structure of the server 1200 shown in FIG. 12.

The server 1200 may be different from other servers because of the difference of configuration and performance. The server 1200 includes a power supply 1210, an interface 1230, at least one storage medium 1250 and at least one Central Processing Units (CPUs) 1270.

The power supply 1210 may provide working voltage for hardware equipment in the server 1200.

The interface 1230 may include at least one wired or wireless network interface 1231, at least one serial-to-parallel conversion interface 1233, at least one input/output interface 1235 and at least one USB interface 1237, which are all used to communicate with peripheral equipment.

As a carrier of storage resources, the storage medium 1250 may be a random storage medium, a disk or an optical disk. The resources stored in the storage medium 1250 include an operation system 1251, an application 1253 and data 1255. The storage mode may be a transitory storage mode or a non-transitory storage mode. The operation system 1251 may manage and control the hardware equipment and the application 1253 in the server 1200, so that the CPU 1270 can compute and process a mass of data. The operation system 1251 may be Windows Server™, Mac OS X™, Unix™, Linux and FreeBSD™. The application 1253 is a computer program for implementing at least one specific function based on the operation system 1251, and may include at least one module (not shown in FIG. 12), and each module may include a series of operation instructions for the server 1200. The data 1255 may be the user card data and the data transfer user identifier stored in the disk.

The CPU 1270 may include one or more processors, and may communicate with the storage medium 1250 via buses, and calculate and process the mass of data in the storage medium 1250.

The CPU 1270 may read the series of operation instructions from the storage 1250, and execute the operation instructions on the server 1200 based on the operation system 1251 in the storage medium 1250. Accordingly, all or part of steps of the above embodiments may be implemented through running related computer programs on the data transfer server.

Figure 13:
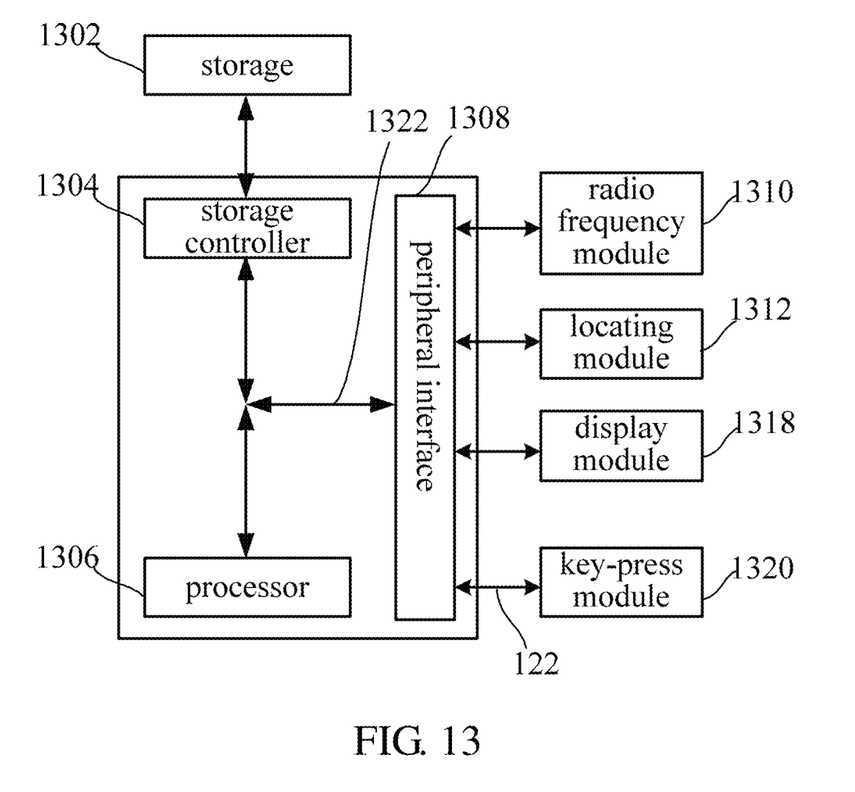
FIG. 13 is a diagram illustrating the structure of a terminal according to an embodiment of the present disclosure.

FIG. 13 is a diagram illustrating the structure of a terminal 1300 according to an embodiment of the present disclosure. As shown in FIG. 13, the terminal 1300 includes a storage 1302, a storage controller 1304, one or more processors 1306 (only one is shown in FIG. 13), a peripheral interface 1308, a radio frequency module 1310, a locating module 1312, a display module 1318 and a key-press module 1320. These components may communicate with each other via one or more communication buses/signal lines 1322.

It should be understood that the structure shown in FIG. 13 is only schematic, and the terminal 1300 may include more or less components than that shown in FIG. 13, or have a component arrangement different from that shown in FIG. 13. The components shown in FIG. 13 may be implemented through hardware, software or combination thereof.

The storage 1302 may store software programs and modules, for example, program instructions/modules corresponding to the method for implementing verification within data transfer described in the embodiments of the present disclosure. The processor 1306 may operate the software programs and modules stored in the storage 1302 to implement a variety of functional applications and data processing.

The storage 1302 may include a high-speed random access memory and a non-transitory memory such as one or more disk storage devices, flash devices or non-transitory solid-state storage devices. In some embodiments, the storage 1302 may further include storages remotely configured with respect to the processor 1306, and these storages may be connected to the terminal 1300 via networks. The networks include, but are not limited to, Internet, Intranet, a local area network, a mobile communication network and combination thereof. The access of the processor 1306 and other possible components to the storage 1302 may be performed under the control of the storage controller 1304.

The peripheral interface 1308 may couple various input/output equipment to the processor 1306 and the storage 1302. The processor 1306 operates various software and instructions stored in the storage 1302 to execute various functions of the terminal 1300 and perform data processing.

In some embodiments, the peripheral interface 1308, the processor 1306 and the storage controller 1304 may be implemented in one chip, and in other embodiments, they may be implemented in respective chips.

The radio frequency module 1310 may receive and send electromagnetic wave and perform conversion between the electromagnetic wave and electrical signals, so as to communicate with a communication network or other equipment. The radio frequency module 1310 may include various circuit components for implementing those functions, such as antenna, radio frequency transceiver, digital signal processor, encryption/decryption chip, subscriber identity module (SIM) card and storage. The radio frequency module 1310 may communicate with various networks such as Internet, Intranet and wireless networks or communicate with other equipment through the wireless networks. The wireless networks may include a cellular telephone network, a wireless LAN or a metropolitan area network. The wireless networks may adopt various communication standards, protocols and technologies, which include, but are not limited to, Global System for Mobile Communication (GSM), Enhanced Data GSM Environment (EDGE), Wideband Code Division Multiple Access (W-CDMA), Code division access (CDMA), Time Division Multiple Access (TDMA), bluetooth, Wireless, Fidelity (WiFi) (for example, Institute of Electrical and Electronics Engineers (IEEE) standards including IEEE 802.11a, IEEE 802.11b, IEEE802.11g and/or IEEE 802.11n), Voice over internet protocol (VoIP), Worldwide Interoperability for Microwave Access (Wi-Max), other protocols used for mails, instant messaging and SMS, and any other proper communication protocols, even undeveloped protocols.

The locating module 1312 may obtain the current location of the terminal 1300, and includes, but is not limited to, Global Positioning System (GPS) and positioning technology based on the wireless local network or the mobile communication network.

The display module 1318 may provide an output interface between the terminal 1300 and the user. The display module 1318 may display video output for the user. The contents of the video output may include characters, graphics, video and combination thereof. Some output results correspond to some user interface objects. The display module 1318 may further provide an input interface between the terminal 1300 and the user to receive the input of the user, for example, gesture operations of the user such as clicking, gliding and so on, so that the user interface objects respond to the input of the user. The technology for detecting the input of the user may be a touch detection technology based on a resistive mode or a capacitive mode or any other possible touch detection technology. In some embodiments, the display module 1318 may include, but are not limited to, a liquid crystal display or a light-emitting polymer display.

The key-press module 1320 may provide an interface for inputting by the user in the terminal 1300. The user may press different keys to make the terminal 1300 implement different functions.

In the above embodiments, according to the user card identifier and the payment password of the selected user card that are obtained through the data transfer request interface, a payment verification request is initiated to the data transfer server, and the current time valid identifier is received that is returned by the data transfer server when the payment verification is passed. The current time valid identifier is issued when the data transfer server determines that the current time does not exceed the valid period of the card-binding time of the selected user card. In this case, the terminal can skip the second verification interface according to the current time valid identifier and directly enter the data transfer confirmation interface, so as to avoid one security verification process during the valid period of the card-binding time, and decrease the processing complexity of the terminal within data transfer.

The foregoing is only embodiments of the present disclosure and is not used to limit the protection scope of the present disclosure. Those skilled in the art may perform improvement and modification according to the idea and spirit of the present disclosure. And thus, the protection scope of the present disclosure should be defined by disclosure and the claims.

What is claimed is:

1. A method for implementing verification within data transfer, comprising:

obtaining a user card identifier and a data transfer password of a selected user card through a data transfer request interface;

initiating a data transfer verification request to a data transfer server, the data transfer verification request being generated according to the user card identifier, the data transfer password and a data transfer user identifier;

receiving a current time valid identifier that is returned by the data transfer server when the data transfer verification is passed, the current time valid identifier being issued when the data transfer server determines that the current time does not exceed a valid period of card-binding time of the selected user card; and skipping a second verification interface according to the current time valid identifier and directly accessing a data transfer confirmation interface.

2. The method of claim 1, before obtaining the user card identifier and the data transfer password of the selected user card through the data transfer request interface, further comprising:

detecting a user card adding instruction triggered in a terminal; and invoking a card-binding public component according the user card adding instruction, so that a relationship between user card data of the newly added user card and the data transfer user identifier is added in a payment server through the card-binding public component, and card-binding time is labeled.

3. The method of claim 1, before receiving the current time valid identifier that is returned by the data transfer server when the data transfer verification is passed, further comprising:

extracting the data transfer password and the data transfer user identifier from the data transfer verification request in the data transfer server to perform data transfer verification;

extracting a user card identifier from the data transfer verification request when the verification of the data transfer password is passed, and returning the card-binding time to a payment server according to the user card identifier and the data transfer user identifier;

determining whether the current time does not exceed the valid period of the card-binding time; and when determining that the current time does not exceed the valid period of the card-binding time, returning a current time valid identifier to a terminal.

4. The method of claim 3, before receiving the current time validity identifier that is returned by the data transfer server when the data transfer verification is passed, further comprising:

when determining that the current time exceed the valid period of the card-binding time, returning a current time invalid identifier to the terminal, so that the terminal accesses the second verification interface.

5. The method of claim 4, after returning the current time invalid identifier to the terminal when determining that the current time exceed the valid period of the card-binding time, further comprising:

receiving the current time invalid identifier returned by the data transfer server;

accessing the second verification interface according to the current time invalid identifier to trigger second verification of data transfer; and accessing the data transfer confirmation interface after the second verification is passed.

6. A system for implementing verification within data transfer, comprising a processor and a non-transitory storage medium, wherein the non-transitory storage medium stores one or more computer readable instructions, and the processor executes the computer readable instructions stored in the non-transitory storage to obtain a user card identifier and a data transfer password of a selected user card from a data transfer request interface;

initiate a data transfer verification request to a data transfer server, the data transfer verification request being generated according to the user card identifier, the data transfer password and a data transfer user identifier;

receive a current time valid identifier that is returned by the data transfer server when the data transfer verification is passed, the current time valid identifier being issued when the data transfer server determines that the current time does not exceed a valid period of card-binding time of the selected user card; and skip a second verification interface according to the current time valid identifier and directly access a data transfer confirmation interface.

7. The system of claim 6, wherein the processor executes the computer readable instructions stored in the non-transitory storage to further detect a user card adding instruction triggered in a terminal; and invoke a card-binding public component according to the user card adding instruction, so that a relationship between user card data of the newly added user card and the data transfer user identifier is added in a payment server through the card-binding public component, and the card-binding time is labeled.

8. The system of claim 6, wherein the processor executes the computer readable instructions stored in the non-transitory storage to further extract the data transfer password and the data transfer user identifier from the data transfer verification request in the data transfer server to perform data transfer verification;

extract a user card identifier from the data transfer verification request when the verification of the data transfer password is passed, and return the card-binding time to a payment server according to the user card identifier and the data transfer user identifier;

determine whether the current time does not exceed the valid period of the card-binding time; and return a current time valid identifier to a terminal when determining that the current time does not exceed the valid period of the card-binding time.

9. The system of claim 8, wherein the processor executes the computer readable instructions stored in the non-transitory storage to further return a current time invalid identifier to the terminal, so that the terminal accesses the second verification interface.

10. The system of claim 9, wherein the processor executes the computer readable instructions stored in the non-transitory storage to further receive the current time invalid identifier returned by the data transfer server;

access the second verification interface according to the current time invalid identifier to trigger second verification of data transfer; and access the data transfer confirmation interface after the second verification is passed.

11. A non-transitory computer readable storage medium for storing programs, wherein the programs are executed by a computer to perform a process of:
    obtaining a user card identifier and a data transfer password of a selected user card through a data transfer request interface;
    initiating a data transfer verification request to a data transfer server, the data transfer verification request being generated according to the user card identifier, the data transfer password and a data transfer user identifier;
    receiving a current time valid identifier that is returned by the data transfer server when the data transfer verification is passed, the current time valid identifier being issued when the data transfer server determines that the current time does not exceed a valid period of card-binding time of the selected user card; and
    skipping a second verification interface according to the current time valid identifier and directly accessing a data transfer confirmation interface.

12. The non-transitory computer readable storage medium of claim 11, wherein the programs are executed by the computer to further perform a process of:
    detecting a user card adding instruction triggered in a terminal; and
    invoking a card-binding public component according the user card adding instruction, so that a relationship between user card data of the newly added user card and the data transfer user identifier is added in a payment server through the card-binding public component, and card-binding time is labeled.

13. The non-transitory computer readable storage medium of claim 11, wherein the programs are executed by the computer to further perform a process of:
    receiving the current time invalid identifier returned by the data transfer server;
    accessing the second verification interface according to the current time invalid identifier to trigger second verification of data transfer; and
    accessing the data transfer confirmation interface after the second verification is passed.

* * * * *